United States Patent
Teng

(10) Patent No.: US 7,396,071 B2
(45) Date of Patent: Jul. 8, 2008

(54) VEHICLE DOOR PILLAR DECORATIVE PANEL

(76) Inventor: Wei-Cheng Teng, No. 30-20, Lane 53, Jyun-an Street, Shu-Lin City, Taipei (TW)

( * ) Notice: Subject to any disclaimer, the term of this patent is extended or adjusted under 35 U.S.C. 154(b) by 24 days.

(21) Appl. No.: 11/635,532

(22) Filed: Dec. 8, 2006

(65) Prior Publication Data

US 2008/0136216 A1 Jun. 12, 2008

(51) Int. Cl.
*B60J 7/00* (2006.01)
(52) U.S. Cl. .................................................. 296/193.06
(58) Field of Classification Search ............ 296/193.06, 296/1.08; 428/31
See application file for complete search history.

(56) References Cited

U.S. PATENT DOCUMENTS

| | | | | |
|---|---|---|---|---|
| 5,744,210 A | * | 4/1998 | Hofmann et al. | 428/31 |
| 6,073,992 A | * | 6/2000 | Yamauchi et al. | 296/203.01 |
| 6,758,510 B1 | * | 7/2004 | Starling | 296/193.06 |
| 6,832,800 B2 | * | 12/2004 | Hwang | 296/193.06 |
| 7,021,700 B2 | * | 4/2006 | Yoshida | 296/193.06 |
| 7,152,914 B2 | * | 12/2006 | Dingman et al. | 296/193.05 |
| D552,021 S | * | 10/2007 | Teng | D12/190 |
| 7,309,090 B2 | * | 12/2007 | Troton | 296/1.08 |
| 2002/0167152 A1 | * | 11/2002 | Preisler et al. | 280/728.3 |
| 2004/0056514 A1 | * | 3/2004 | Miyazaki | 296/193.06 |
| 2004/0256843 A1 | * | 12/2004 | Totani et al. | 280/730.2 |
| 2007/0059487 A1 | * | 3/2007 | Dooley et al. | 428/137 |

* cited by examiner

*Primary Examiner*—Kiran B. Patel
(74) *Attorney, Agent, or Firm*—Troxell Law Office, PLLC

(57) ABSTRACT

A vehicle door pillar decorative panel is primarily composed of a base board having a recession in which a panel is adhered. A protruding block is fastened to the panel to form a decorative panel. And, by way of various surface treatments, the decorative panel may have a frosted or mirror surface to accomplish a high quality visual effect. Besides, by way of the design of the protrusions, the decorative panel may further provide a three-dimensional feeling, which is extremely applicable to the vehicle door pillar for decoration purposes.

6 Claims, 4 Drawing Sheets

VEHICLE DOOR PILLAR DECORATIVE PANEL

BACKGROUND OF THE INVENTION (a) Field of the Invention

The present invention relates to a vehicle door pillar decorative panel, which, via various surface treatments and arrangements, may accomplish high quality and three-dimensional effects, particularly applicable to various kinds of vehicle.

(b) Description of the Prior Art

In view of the speedy promotion of people's life and the prosperous development of vehicle industry, use of vehicle has become more and more popular. As vehicle not only can serve as a convenient traffic instrument, but also can personal taste, many people like to install some decoration on their vehicle to show their special taste, and beautify their vehicle. Accordingly, there exists a need in developing a decorative panel of high quality and excellent visual effects, which is also the desire of consumers.

In view of this, the inventor has elaborated in research and development of the novel product, and has accomplished a decorative panel of high quality and three-dimensional effects.

SUMMARY OF THE INVENTION

The primary object of the invention is to provide a vehicle door pillar decorative panel, which, by way of various surface treatments, may have a frosted or mirror surface to accomplish a high quality visual effect, applicable to vehicle decoration.

To obtain the above objects, the vehicle door pillar decorative panel of the invention is primarily composed of a base board, a panel and a protruding block. Respective folds are downwardly provided at the two sides of the base board. The front surface of the base board has a recession in which a plurality of first through holes are provided. The panel, which has a plurality of second through holes corresponding to those in the recession, is adhered into the recession. A protruding block is fastened onto the panel by way of screws which go through the first and the second through holes on the base board and the panel, and are fastened to the screw holes on the protrusions under the protruding block. Furthermore, by way of various surface treatments (such as frosted surface, mirror surface) and arrangements, a decorative panel of high quality and three-dimensional effects is accomplished.

To completely appreciate these and other objects of the present invention as well as the invention itself, all of which will become apparent to those skilled in the art, the following detailed description of the invention and the claims should be read in conjunction with the accompanying drawings.

DETAILED DESCRIPTION OF THE PREFERRED EMBODIMENTS

Figure 1:
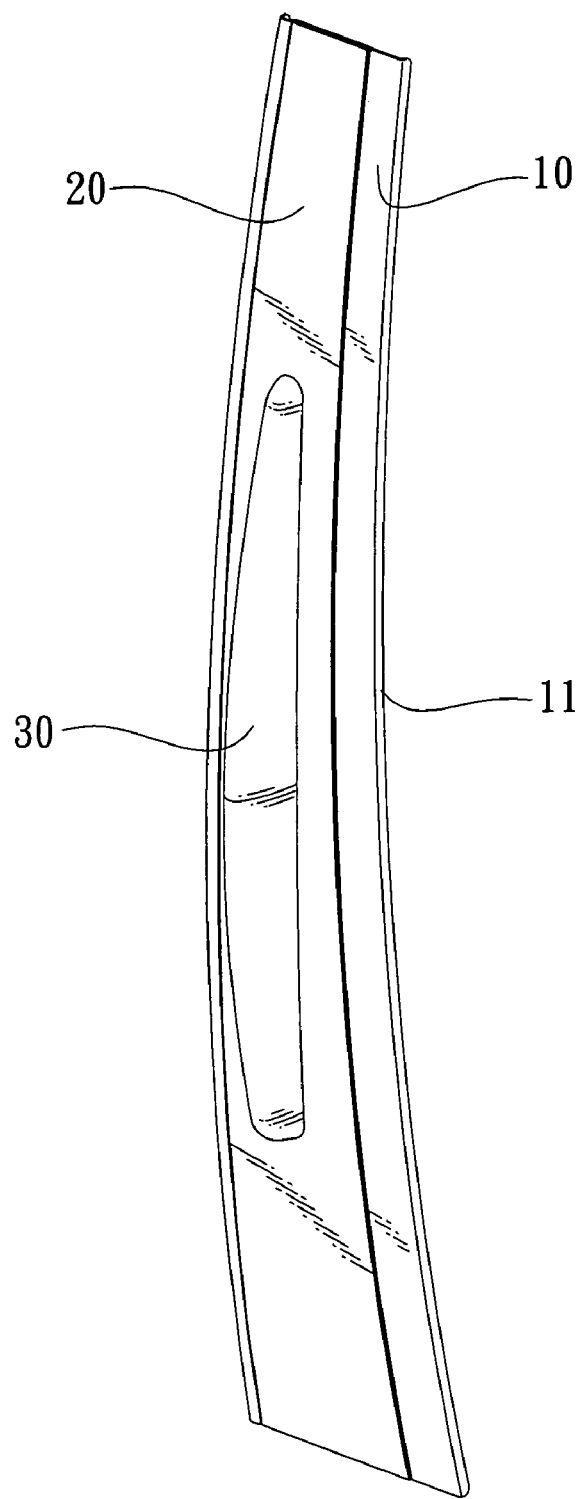
FIG. 1 is a perspective view of the present invention.
Figure 2:
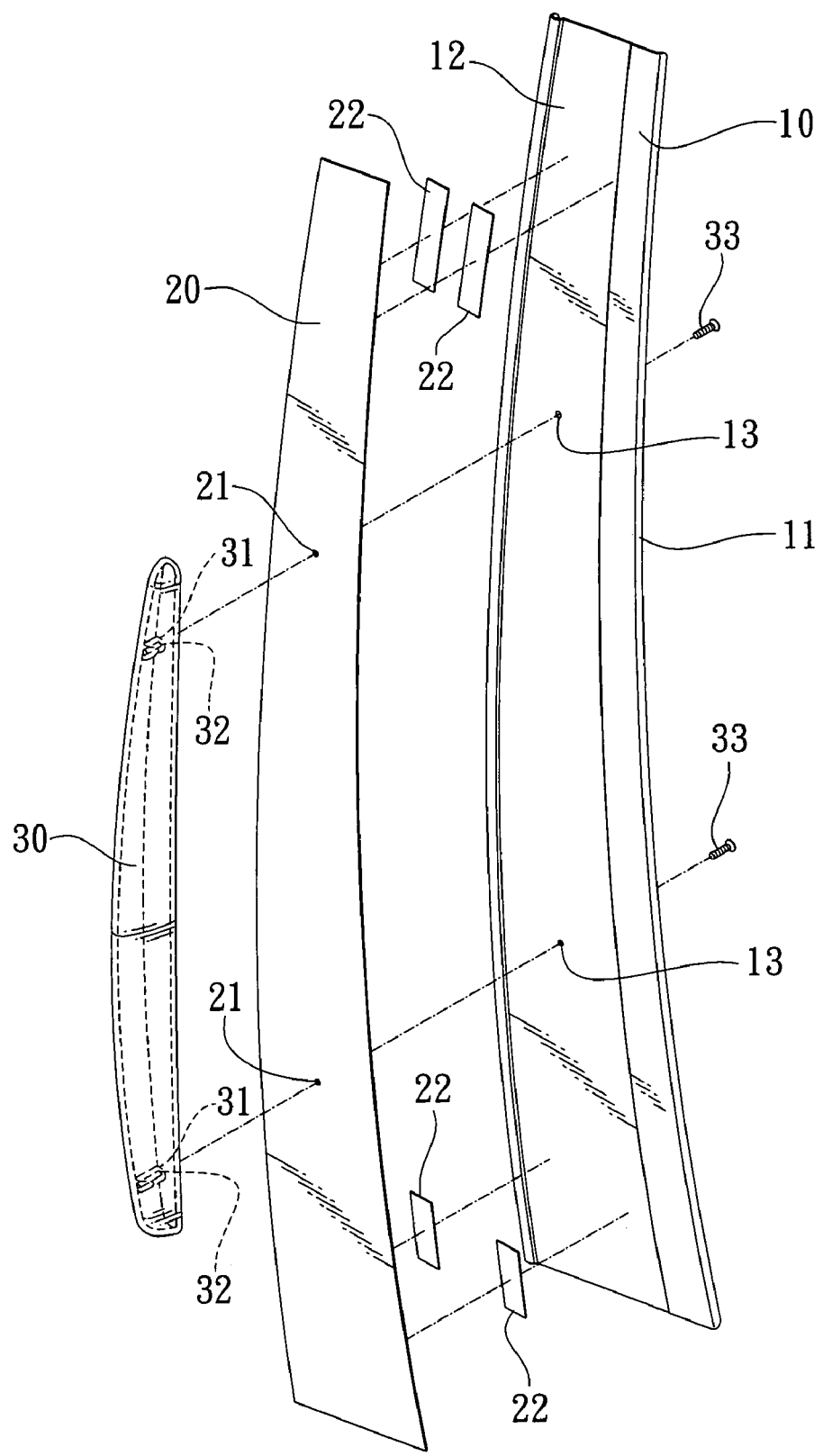
FIG. 2 is an exploded view of the invention.
Figure 3:
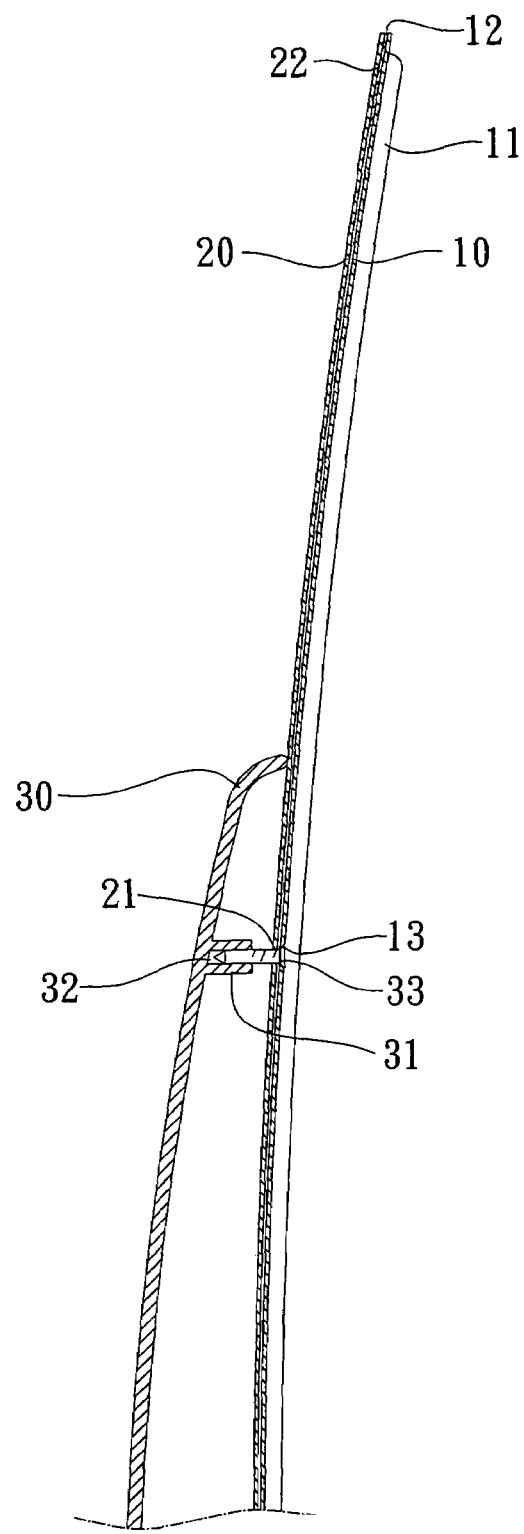
FIG. 3 is a partially enlarged view of the invention.

Referring to FIGS. 1 to 3, the vehicle door pillar decorative panel of the invention is composed of a base board 10, a panel 20 and a protruding block 30.

The base board 10 is designed to be an arc board to fit the outer appearance of the applied-to vehicle. Respective folds 11 are downwardly provided at the two sides of the base board 10, the front surface of which has a combination portion in form of a recession 12 having a plurality of first through holes 13.

The panel 20 is accommodated to the board of the recession 12 in the combination portion, and provided with a plurality of second through holes 21 corresponding to a plurality of first through holes 13 in the recession 12, as well as adhered into the recession 12 of the base board 10 via adhesive materials 22.

The bottom of the protruding block 30 has protrusions 31 corresponding to a plurality of second through holes 21 on the panel 20. Each of the protrusions 31 has a screw hole 32 for fastening the screws 33 which go through the first through holes 13 on the base board 10 and the second through holes 21 on the panel 20, thereby accomplishing a decorative panel structure.

Figure 4:
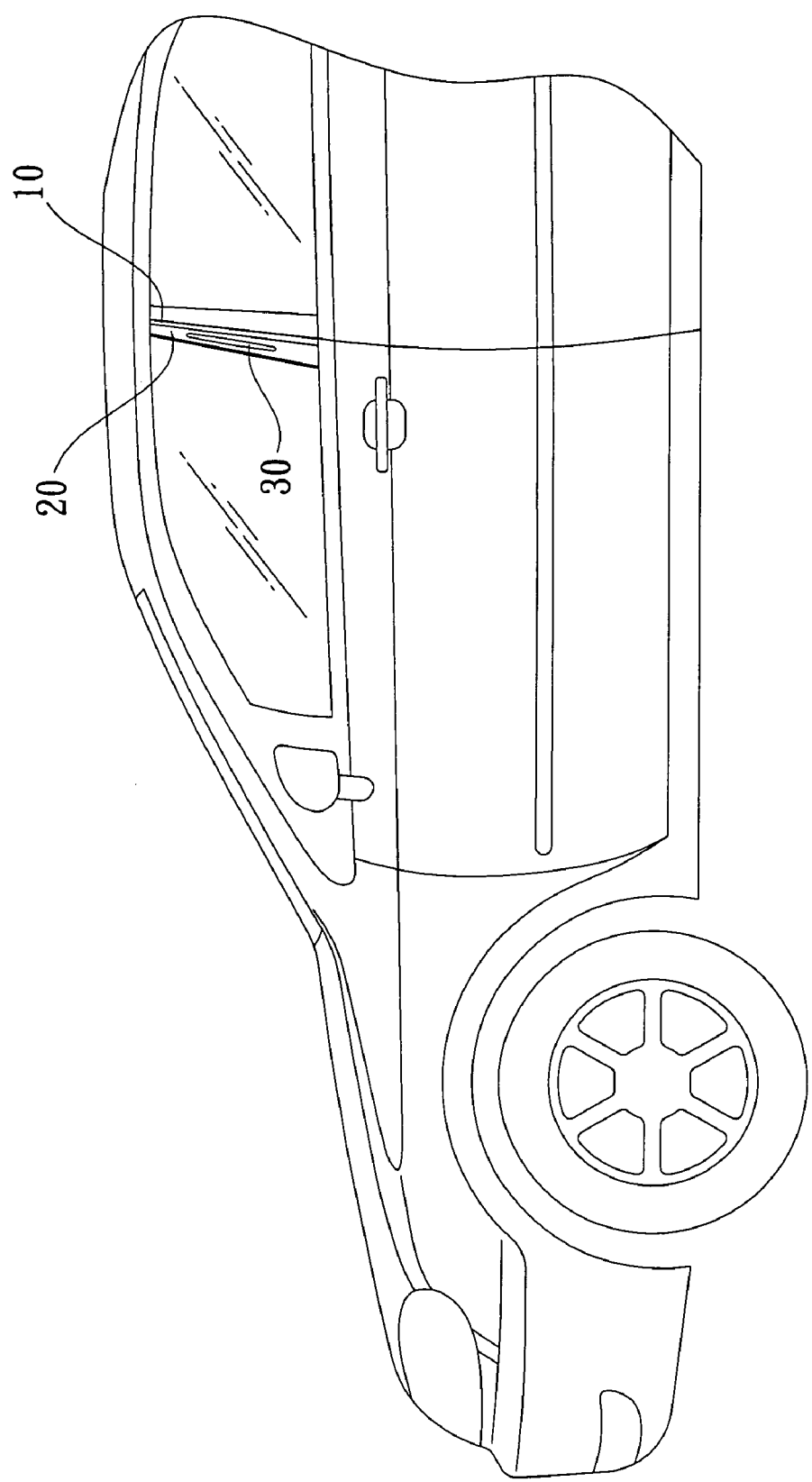
FIG. 4 shows an embodiment of the invention.

As shown in FIGS. 1 and 4, when adhering the decorative panel onto the surface of the vehicle door pillar, by way of the various surface treatments and arrangements, such as the base board 10 is provided with a mirror surface, the panel 20 is provided with a frosted surface, and the protruding block 30 is provided with a mirror surface, a strong feeling of gradual levels can be obtained. Besides, by way of the design of the protruding block 30 on the panel 20, the decorative panel can have a three-dimensional effect, rendering the vehicle higher quality and more aesthetic.

While certain novel features of this invention have been shown and described and are pointed out in the annexed Claims, it is not intended to be limited to the details above, since it will be understood that various omissions, modifications, substitutions and changes in the forms and details of the device illustrated and in its operation can be made by those skilled in the art without departing in any way from the spirit of the present invention.

Although specific embodiments have been illustrated and described, it will be obvious to those skilled in the art that various modifications may be made without departing from what is intended to be limited solely by the appended claims.

What is claimed is:

1. A vehicle door pillar decorative panel, comprising: a base board, a panel and a protruding block; wherein, the base board is provided with a combination position where there are a plurality of first through holes, an adhered panel which has a plurality of corresponding second through holes; a protruding block is provided on the panel by way of screws which go through the base board and the panel thereby fastening the protrusions under the protruding block; by way of the different surface treatments, a decorative panel of high quality and three-dimensional effect is accomplished.

2. The vehicle door pillar decorative panel according to claim 1, wherein respective folds are downwardly provided at the two sides of the base board.

3. The vehicle door pillar decorative panel according to claim 1, wherein a recession is formed on the combination portion of the base board.

4. The vehicle door pillar decorative panel according to claim 1, wherein the base board has a mirror surface.

5. The vehicle door pillar decorative panel according to claim 1, wherein the panel has a frosted surface.

6. The vehicle door pillar decorative panel according to claim 1, wherein the protruding block has a mirror surface.

* * * * *